Feb. 13, 1962 R. A. BARRASS 3,021,380
LIQUID-COOLED CABLE FOR ELECTRIC FURNACES
AND CONNECTORS THEREFOR
Original Filed Nov. 30, 1955 2 Sheets-Sheet 1
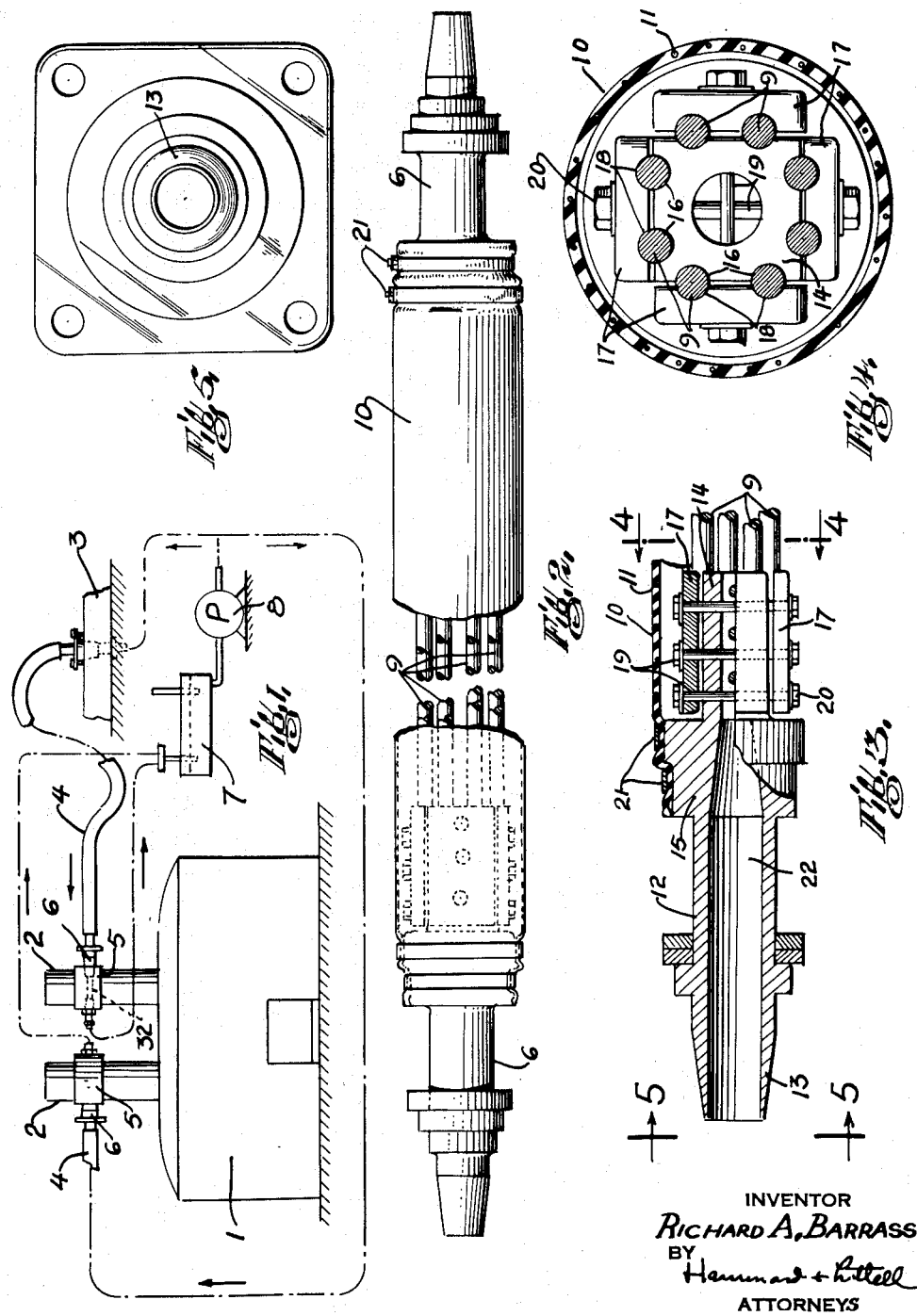
INVENTOR
RICHARD A. BARRASS
BY
ATTORNEYS

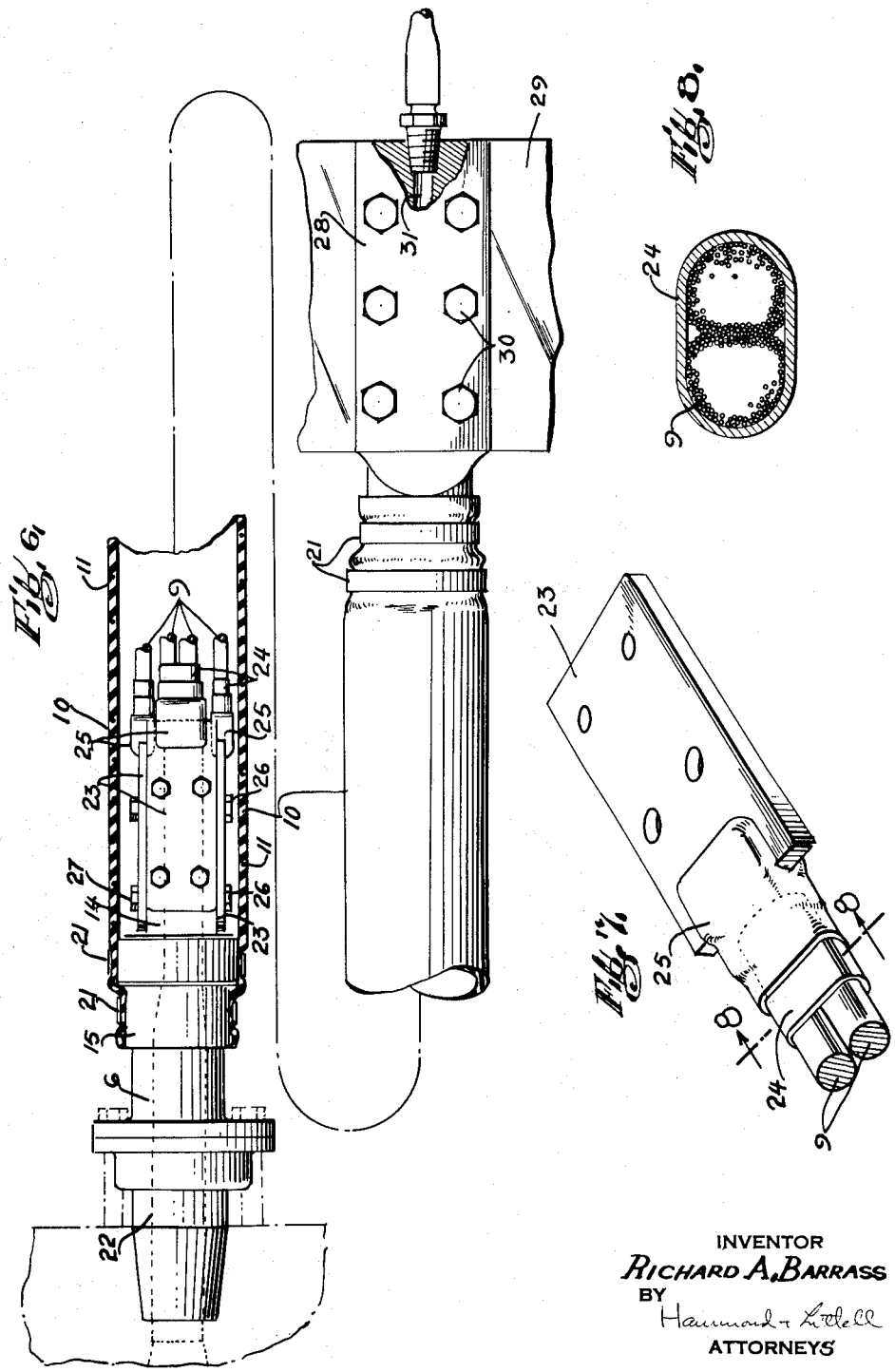

United States Patent Office 3,021,380
Patented Feb. 13, 1962

3,021,380
LIQUID-COOLED CABLE FOR ELECTRIC FURNACES AND CONNECTORS THEREFOR
Richard A. Barrass, Pocatello, Idaho, assignor to FMC Corporation, a corporation of Delaware
Original application Nov. 30, 1955, Ser. No. 550,088. Divided and this application June 11, 1959, Ser. No. 830,972
2 Claims. (Cl. 174—15)

This invention relates to liquid-cooled electric cables for electric furnaces and connectors for such cables, and more particularly to liquid-cooled electric cables and connectors for electric phosphorus furnaces and the like.

In the operation of electric furnaces of the type used in the manufacture of elemental phosphorus and the like, it is important that the electrical connectors from the transformer to the furnace electrodes be not only efficient in the transmission of the electric energy but also economical in operation and low in cost. Moreover, it is important that such connectors do not endanger the safety of the operating personnel.

Various types of cables and connectors have heretofore been used in industry. For example, the electrical connection between the transformer bus bars and the electrodes of the furnace has been effected by rigid metal bars which are provided with suitable connector plugs at both ends. Similarly, flexible metal cables or thin metallic strips, with suitable connector fittings, have been used to permit free movement of the electrodes in a vertical direction relative to the transformer bus bars. In either case, however, these types of cables have serious disadvantages in that uninsulated air-cooled connecting cables radiate considerable heat, are prone to rapid corrosion and oxidation, and present a serious safety hazard for the operating personnel. Moreover, air-cooled cables have a very limited current-carrying capacity, whereby the capacity of the furnace can be substantially limited.

To overcome the problem of low current-carrying capacity the cables have been provided with flexible metal jackets wherein water or any other suitable cooling fluid is circulated. However, while the current-carrying capacity of such modified cables is higher than that of air-cooled cables, they are still as much of a safety hazard as exposed air-cooled cables, and are usually very expensive.

The attachment of the ends of the metal cables to the connector plugs has heretofore been accomplished by providing the rearward end of the plugs with wells or recesses wherein the ends of the metal cables are placed and then soldered in place with the aid of silver solder. While this method produces excellent electrical contact between the cable and the connector plug, the materials involved are costly and the labor required is highly skilled and therefore quite expensive.

It is one object of the present invention to provide flexible cables for electric furnaces, which have a high current rating.

Another object of this invention is to provide flexible cables for electric furnaces which do not radiate substantial amounts of heat.

Another object of the present invention is to provide flexible cables for electric furnaces wherein the current-carrying conductors are protected from corrosion and oxidation.

Another object of the present invention is to provide flexible insulated cables for electric furnaces which do not present safety hazards for operating personnel.

Another object of this invention is to provide simple, inexpensive and yet effective means for attaching connector plugs to the ends of metal cables for electric furnaces.

Still another object of this invention is to provide flexible, liquid-cooled electrical cable units for use in connection with electric furnaces for the manufacture of elemental phosphorus and the like.

Other objects and advantages will become apparent as the description of the invention proceeds.

The above objects are achieved with the aid of the devices and apparatus shown in the attached drawings, of which:

FIG. 1 is a schematic representation of the electric furnace, the electrodes, the transformer bus bar, the flexible electric cables and the flow of cooling liquid through the cables.

FIG. 2 is a side view of the assembled liquid-cooled cable embodying this invention.

FIG. 3 is a sectional view of a connector plug with attached conductors.

FIG. 4 is a cross-sectional end view of the cable along lines 4—4 of FIG. 3.

FIG. 5 is an end view of the forward end of a connector plug.

FIG. 6 is a side view, in partial section, of a liquid-cooled cable with attached connector plugs, embodying a modification of this invention.

FIG. 7 is a perspective view of a pair of conductors and a connector plate fastened together in accordance with another embodiment of this invention.

FIG. 8 is a sectional view of the embodiment of FIG. 7 along line 8—8.

Referring to the drawings more in detail, and particularly to FIG. 1, the system to which this invention is applied consists essentially of a furnace 1, electrodes 2 extending into the furnace, and a transformer or another suitable power source (not shown) comprising bus bars 3. To establish the electrical connection between bus bars 3 and electrodes 2, flexible rubber-jacketed cables 4 are attached at one end to connector clamps 5 on the electrodes 2 and at the other end to bus bars 3 by means of connector plugs or terminals 6. Cables 4 are cooled by a flow of liquid coolant, preferably water, which is circulated from heat exchanger or reservoir 6 through the cables, around the electrodes through annular passage 32 in clamp 5, and back into the reservoir by a pump 8, as schematically indicated by the broken lines and the arrows in FIG. 1.

FIGURES 2, 3, 4 and 5 illustrate the particular structure of cable 4 of FIG. 1 and the novel method of attaching the cable to terminals 6. (For the purposes of this specification and the claims hereinafter set forth, the term, conductors, shall mean either one or more conductors and thus, a cable may be comprised of one or more conductors.) The cable 4 consists of flexible conductors 9 and a flexible insulated hose 10. The conductors are made by and desired conductive metal having a high conductivity, preferably of copper. The flexible insulated hose 10 may be made of rubber or plastic material, and may be coated or uncoated on the outside surface with asbestos or the like. To prevent kinking, so as not to block the free flow of colling liquid through the cable, the hose 10 may be reinforced with wire 11 embedded in the hose in the form of a spiral or rings. It is preferred that wire 11 be non-magnetic.

Terminals 6 are composed of a forward portion 12 with tapered end 13, a rearward portion 14 and an intermediate portion 15. The outer surface of tapered portion 13 is preferably provided with a silver coating to insure perfect contact when the terminal is inserted into the corresponding female socket in electrode connector clamps 5 or in bus bars 3. Rearward portion 14 comprises longitudinally extending grooves or recesses 16 adapted to receive conductors 9 therein.

Cable 4 is attached to terminals 6 by placing the ends of conductors 9 into recesses 16 and clamping the conductors in place with the aid of clamping flanges 17 having grooves or recesses 18 therein. The mechanical pressure required to clamp the conductors in place is produced by bolts 19 and corresponding nuts 20. Flexible hose 10 is attached to the intermediate portion 15 of terminal 6 by band and buckle type clamping members 21.

A continuous bore 22 extends from the forward end of terminal 6 to the rearward end thereof to permit cooling fluid to circulate through the cable assembly while the furnace is in operation.

Another embodiment of this invention is shown in FIGS. 6 through 8 of the drawings. This embodiment makes use of another very effective and yet inexpensive method of attaching the conductor to the connector terminals at the electrode end and the bus bar end of the liquid-cooled cable. The cable consists of flexible conductors 9, which in this case are preferably rope lay cables, and a flexible insulated hose 10 having spiral or annular wire reinforcement members 11 embedded therein. The conductors 9 are attached to flat plates 23, one pair of conductors to each plate, as shown in FIG. 7. The attachment of the conductors to the flat plate is effected by inserting the pair of conductors into a sleeve 24 and then welding the sleeves and the conductors to the plate with the aid of a thermite weld 25. The use of a thermite weld has been found to be a very convenient and efficient way of fastening the conductors to plate 23, but any other suitable method of welding, such as arc welding and the like may also be used. Plates 23 are fastened to the rearward portion 14 of terminal plug 6 by means of bolts 26 and corresponding nuts 27. Hose 10 may be clamped onto intermediate portion 15 of terminal plug 6 with band and buckle type clamping members 21. Similar to terminal plug 6 in FIG. 3, the terminal plug in the embodiment of FIG. 6 comprises a longitudinal bore 22 to permit the circulation of cooling liquid through the cable assembly.

As a further modification, the terminal plug at the bus bar end of the cable may be constructed as shown in the bottom portion of FIG. 6. In this modification the intermediate and rearward portions of the terminal are substantially identical to the corresponding portions of terminal 6 shown in the upper portion of FIG. 6. The forward portion 28, however, is substantially flat in shape. It is inserted between a pair of bus bars 29 and held in place with bolts 30. A bore 31 extends longitudinally through the terminal to allow circulation of the cooling liquid through the cable assembly.

The cooling liquid circulating through the cables described herein is preferably water, but any other non-corrosive coolant may, of course, also be used.

The cable assemblies disclosed herein are relatively inexpensive and do not require specially skilled labor for the production thereof. In addition, such cable assemblies contribute to the safety of the operating personnel in that they are insulated over practically their entire length and particularly over that portion of the cable which a workman might contact. Moreover, the current rating is considerably higher than that of the air-cooled flexible cables heretofore employed in conjunction with electric furnaces.

Although it has been stated that the cables according to this invention are particularly adapted for use with electric phosphorus furnaces, it is quite evident that they may readily be employed in conjunction with any electric furnace wherein electric power is transferred from a power source to the furnace electrodes, such as in all types of arc furnaces.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. In a flexible liquid-cooled electric power transmission cable comprising flexible metal conductors, a flexible insulated hose surrounding said conductors, terminal plugs at the ends of said conductors, said terminal plugs having a forward portion, an intermediate portion, a rearward portion and a continuous longitudinal bore extending through said plugs, and means for removably clamping said hose to said intermediate portion of said terminal plugs, the improvement which consists of metal extensions permanently attached to the ends of said conductors and means for removably fastening said extensions to the rearward portions of said terminal plugs.

2. In a flexible liquid-cooled electric power transmission cable comprising flexible metal conductors, a flexible insulated hose surrounding said conductors, terminal plugs at the ends of said conductors, said terminal plugs having a forward portion, an intermediate portion, a rearward portion and a continuous longitudinal bore extending through said plugs, and means for removably clamping said hose to said intermediate portion of said terminal plugs, the improvement which consists of metal extensions fused to the ends of said conductors and means for removably fastening said extensions to the rearward portions of said terminal plugs.

References Cited in the file of this patent

UNITED STATES PATENTS 2,808,639  Wreford _____ Oct. 8, 1957